United States Patent
Danielian et al.

(10) Patent No.: US 9,761,353 B2
(45) Date of Patent: Sep. 12, 2017

(54) HIGH TEMPERATURE INSULATED BUS PIPE

(71) Applicants: Nikolai Danielian, Kerpen (DE); Fatima Ferkhatovna Yashina, Moscow (RU); Gagik Gamletovich Galstyan, Pavlovskiy Posad (RU)

(72) Inventors: Nikolai Danielian, Kerpen (DE); Fatima Ferkhatovna Yashina, Moscow (RU); Gagik Gamletovich Galstyan, Pavlovskiy Posad (RU)

(73) Assignees: Nikolai Daniellan, Kerpen (DE); Fatima F. Yashina, Moscow (RU)

( * ) Notice: Subject to any disclaimer, the term of this patent is extended or adjusted under 35 U.S.C. 154(b) by 0 days.

(21) Appl. No.: 15/235,387

(22) Filed: Aug. 12, 2016

(65) Prior Publication Data
US 2017/0047147 A1 Feb. 16, 2017

(30) Foreign Application Priority Data
Aug. 13, 2015 (RU) .................. 2015133963

(51) Int. Cl.
*H01B 7/00* (2006.01)
*H01B 7/295* (2006.01)
(Continued)

(52) U.S. Cl.
CPC .............. *H01B 7/295* (2013.01); *H02G 15/02* (2013.01); *H01R 4/70* (2013.01)

(58) Field of Classification Search
CPC . H02G 5/00; H02G 15/02; H02G 5/06; H01R 4/60; H01R 4/643; H01R 4/70; H01R 5/00; H01R 5/007
(Continued)

(56) References Cited

U.S. PATENT DOCUMENTS

| 4,767,894 A | 8/1988 | Schombourg |
| 6,416,122 B1 * | 7/2002 | Schwarz .................. B60J 7/047 296/220.01 |

(Continued)

FOREIGN PATENT DOCUMENTS

RU 2439764 1/2012
WO WO2010090034 8/2010

*Primary Examiner* — William H Mayo, III
(74) *Attorney, Agent, or Firm* — Aleksandr Smushkovich

(57) ABSTRACT

The proposed high temperature insulated bus pipe (busbar section) is equipped with a conductive pipe having end contacts and disposed within electrical insulation, a grounding shield covering the insulation, and a case having a fire-resistant coating. A fire-resistant layer made of a cured composite material is located between the case and the shield. The composite material includes a filler composed of thermally expandable graphite, and a binder configured to form cavities in the fire-resistant layer when the busbar section is exposed to heating. The case is made of a non-magnetic material and is formed as a plain or corrugated vacuum-proof tube. The thickness of fire-resistant layer depends on the cross-section area of conductive pipe and configuration thereof. The binder includes epoxy resin combined with curing agent. The dimension of graphite particles are specified and provided as loose powder or powder whose particles are affixed to a substrate.

4 Claims, 3 Drawing Sheets

(51) Int. Cl.
*H02G 15/02* (2006.01)
*H01R 4/70* (2006.01)

(58) Field of Classification Search
USPC .......... 174/68.1, 70 R, 71 B, 74 B, 75 R, 95, 174/110 R, 102 R, 102 P, 124 R, 129 B
See application file for complete search history.

(56) References Cited

U.S. PATENT DOCUMENTS

2003/0008119 A1* 1/2003 Tono ................ B32B 13/14
428/212
2004/0256605 A1* 12/2004 Reinheimer ............. C08K 9/02
252/606

\* cited by examiner

HIGH TEMPERATURE INSULATED BUS PIPE

CROSS-REFERENCE TO RELATED APPLICATION

This U.S. patent application claims priority under 35 U.S.C. 119 (a) through (d) from a Russian patent application RU2015133963 filed on 13 Aug. 2015, hereby entirely incorporated by reference.

FIELD OF THE INVENTION

The invention relates to means for transmitting electrical energy from power supplies to power consuming facilities; in particular, the invention relates to busbar sections and to busbar systems assembled of separate busbar sections. More specifically, the invention relates to insulated bus pipes for interconnecting electric current components. The invention is to be used in the field of electrical engineering.

BACKGROUND OF THE INVENTION

There is known an insulated bus pipe (busbar section) including: an insulated pipe, a grounding layer, a partly conductive layer, end cheeks (flanges) secured to a casing, and bar contacts having holes (Arrangements of cast insulation busbars, RAUTA-ENERGO).

A number of patent documents disclose a busbar section including a conductive bar having a circular cross-section, a first insulation shell embracing the bar, a second insulation shell, wherein the thickness of the second insulation shell is greater that the thickness of the first insulation shell, a protective layer over the second insulation shell, and a section insulation jacket covering the protective layer (U.S. Pat. No. 4,767,894), as well as busbar sections each including a bar disposed inside insulation layers (WO2010090034A1; CN201527833U).

A prior art busbar section closest to the busbar section claimed herein is a busbar section described in RU2439764C1, including three embodiments.

The first embodiment of the busbar section of RU2439764C1 includes a conductive bar made of an aluminum tube, or a copper tube, or a rod; the bar having end contacts integral with flanges having threaded holes receiving nipples. A graphite layer is disposed on the outer surface of the bar, conduction layers made of conductive paper interlaced with insulation layers made of insulation paper are wrapped over the graphite layer. An aluminum layer made of aluminum foil is disposed over the outer conduction layer and copper strips made of copper foil are positioned over the aluminum layer at the opposite sides of the bar. A layer of insulation paper is wrapped over the copper strips. A flexible heat-shrink tube is placed over the layer of insulation paper in the middle part of the busbar section. A terminal flexible heat-shrink tube is placed at each end part of the busbar section, wherein the terminal heat-shrink tube overlaps the middle heat-shrink tube. All the above-indicated layers of paper, gaps between the layers and gaps between the heat-shrink tubes are filled with a cured epoxy resin and connections of the heat-shrink tubes are made hermetical. A protective steel pipe is disposed over the heat-shrink tubes. All the above-indicated layers of the busbar section are located along the bar length between the flanges of the bar contacts. A grounding contact is provided in the busbar section, the contact connected to the copper strips, wherein the grounding contact is located at the outer surface of the protective steel pipe.

The second embodiment of the busbar section of RU2439764C1 includes a conductive bar made of an aluminum tube, or a copper tube, or a rod, the bar having end contacts integral with flanges having threaded holes receiving nipples. A graphite layer is disposed on the outer surface of the bar, conduction layers made of conductive paper or fabric interlaced with insulation layers made of insulation paper or fabric are wrapped over the graphite layer. An aluminum layer made of aluminum foil is disposed over the outer conduction layer, a copper layer made of copper foil is disposed over the aluminum layer and copper strips made of copper foil are positioned at the opposite sides of the bar. A layer of insulation paper is wrapped over the copper layer. A heat-shrink tube is placed over the layer of insulation paper in the middle part of the busbar section. A flexible terminal heat-shrink tube is placed on each end part of the busbar section, wherein the terminal heat-shrink tube overlaps the middle heat-shrink tube. All the above-indicated layers of paper, gaps between the layers and gaps between the heat-shrink tubes are filled with a cured epoxy resin and connections of the heat-shrink tubes are made hermetical. All the above-indicated layers of the busbar section are located along the bar length between the flanges of the bar contacts.

The third embodiment of the busbar section of RU2439764C1 includes a conductive bar made of an aluminum tube, or a copper tube, the bar having an inside chamber and end contacts integral with flanges having threaded holes receiving nipples. Insulation layers and conduction layers are disposed on the outer surface of the bar and the conduction layers are electrically connected to a grounding contact of the busbar section. A flexible heat-shrink tube is placed over the outer layer in the middle part of the busbar section. A terminal flexible heat-shrink tube is placed on each end part of the busbar section, wherein the terminal heat-shrink tube overlaps the middle heat-shrink tube. All gaps between the heat-shrink tubes and the layers of the busbar section are filled with a cured epoxy resin and connections of the heat-shrink tubes are made hermetical. All the above-indicated layers of the busbar section are located along the bar length between the flanges, wherein at least one hole communicated to the chamber of the bar is provided in each of the flanges.

The first embodiment of the known busbar section of RU2439764C1 shall be used in external busbar systems to be mounted outside buildings. The bar of the busbar section has contacts welded to the butt ends of the bar and the flanges are integral with the contacts. All pinholes of the layers and gaps between the layers of the busbar section and the heat-shrink tubes are filled with an epoxy resin. Two layers of a heat-shrink polyether jacketing tape is wound over the heat-shrink tube in overlapping manner. A protective steel tube case is placed over the jacketing tape.

The second embodiment of the known busbar section of RU2439764C1 shall be used in internal busbar systems to be mounted inside buildings. This busbar section includes all the above-indicated features of the first embodiment except for the protective steel tube case.

Both the embodiments of the busbar section, according to RU2439764C1, provide for a supporting tube layer made of a crepe kraft paper having a density of 100 to 120 g/m$^2$, wherein the thickness of the paper layer is 0.15 to 0.5 mm. In the operational condition, this paper is impregnated with a plasticized epoxy resin. Viscosity of the resin is predetermined and it allows the resin to be cured at 140° C., while maintaining a constant viscosity in the temperature range of 20° C. to 80° C. Both the embodiments of the busbar section include sealing the connection areas of the heat-shrink tubes with a self-adhesive tape made of polyisobutylene.

Additionally, it is provided that the heat-shrink properties of the terminal heat-shrink tube are better than the same of the middle heat-shrink tube.

The third embodiment of the known busbar section provides for cooling the busbar.

The bar of RU2439764C1 is insulated as follows. A composition (e.g. a graphite composition) allowing insulation resin to be detached from the bar is placed on the bar surface between the bar contacts. Nipples are inserted into the threaded holes of the contacts, then layers of a partly conductive paper or a partly conductive fabric interlaced with an isolation paper are wrapped over the bar, wherein a partly conductive layer is formed on the outer layer of the partly conductive paper, the partly conductive layer being a grounding layer. Then aluminum foil is wrapped over the busbar section, thus forming a grid on the partly conductive layer. A copper foil is soldered to the aluminum foil at the both sides of the busbar, and the copper foil is connected to a grounding contact used for connecting the busbar section to a ground loop. The grounding contact is filled with a heat-resistant fatty lubricant and then the grounding contact is sealed. The above-indicated graphite is used in the busbar section in order to allow the insulation resin to be detached from the bar.

Some embodiments of the busbar section of RU2439764C1 include cooling chambers which may be used for delivering cooling air, cold-proof coolant or water from a cooling system. Circulation of the cooling medium through a closed path improves the heat drain from the busbar sections, compensation members and contacts. When the busbar is meant to work at a higher operational temperature, then the third embodiment of the busbar section is used in order to avoid its damage due to overheating. The way of working of the third embodiment is the same as of the first and the second embodiments.

The busbar sections of RU2439764C1 have improved reliability owing to the efficient way of grounding the sections, so as the insulation body of each busbar section and each joint sleeve is grounded separately, and disruption due to potential difference between the bar and the insulation is avoided. Additionally, reliability is improved owing to cooling the busbar section in order to assure effective protection of the busbar against overheating. Cooling the busbar allows maintaining the throughput capability thereof.

The common features of the known busbar section embodiments of RU2439764C1 and the two embodiments of the claimed busbar section are as follows. Each busbar section contains a conductive bar (pipe) having end contacts and disposed within electrical insulation, a grounding shield covering the bar insulation, and a metal case having an outer fire-resistant coating (RU2439764C1, Jan. 10, 2012, the closest prior art).

BRIEF SUMMARY OF THE INVENTION

It was proved in practice that the know busbar sections, manufactured according to Patent RU2439764C1, are durable and fire resistant within some limits of thermal load, however the known busbar sections do not comply adequately with new requirements of safety and reliability. This is due to poor fire resistance of the busbar sections under long thermal load including exposure to direct flame in case of fire. It shall be noted that cooling the busbar sections with air or a liquid requires using cooling devices.

The advantageous effect of the invention is the improved fire resistance of a high temperature insulated bus pipe (herein also called a "busbar section") under long exposure to excessive heat.

The advantageous effect is attained in the inventive high temperature insulated bus pipe, which contains a conductive pipe having end contacts and disposed within electrical insulation, a grounding shield covering the pipe insulation, and a metal case having an outer fire-resistant coating. A fire-resistant layer made of a cured composite material is located between the metal case and the grounding shield. The composite material contains a binder and a thermally expandable graphite filler configured to form cavities in the fire-resistant layer when the busbar section is exposed to heating. The case is made of a non-magnetic material and is formed as a plain or corrugated vacuum-proof tube.

The thickness of the fire-resistant layer is in the range of 3 to 25 mm and is selected depending on the cross-section area of the conductive pipe and configuration thereof, which affect the heat dissipation conditions.

The composite material includes an epoxy resin combined with a curing agent as the binder, and a thermally expandable graphite as the filler, wherein the composition contains 5 to 60 wt % of the thermally expandable graphite and epoxy resin together with the curing agent up to the balance.

The dimensions of thermally expandable graphite particles are 0.5 to 0.8 mm and they are provided in the form of a loose powder or in the form of a powder whose particles are affixed to a special substrate beforehand.

Such a configuration of the busbar section substantially improves the fire resistance of the busbar section according to predetermined time limits for safe electric supply of facilities in fire conditions.

DETAILED DESCRIPTION OF PREFERRED EMBODIMENTS THE INVENTION

Figure 3:
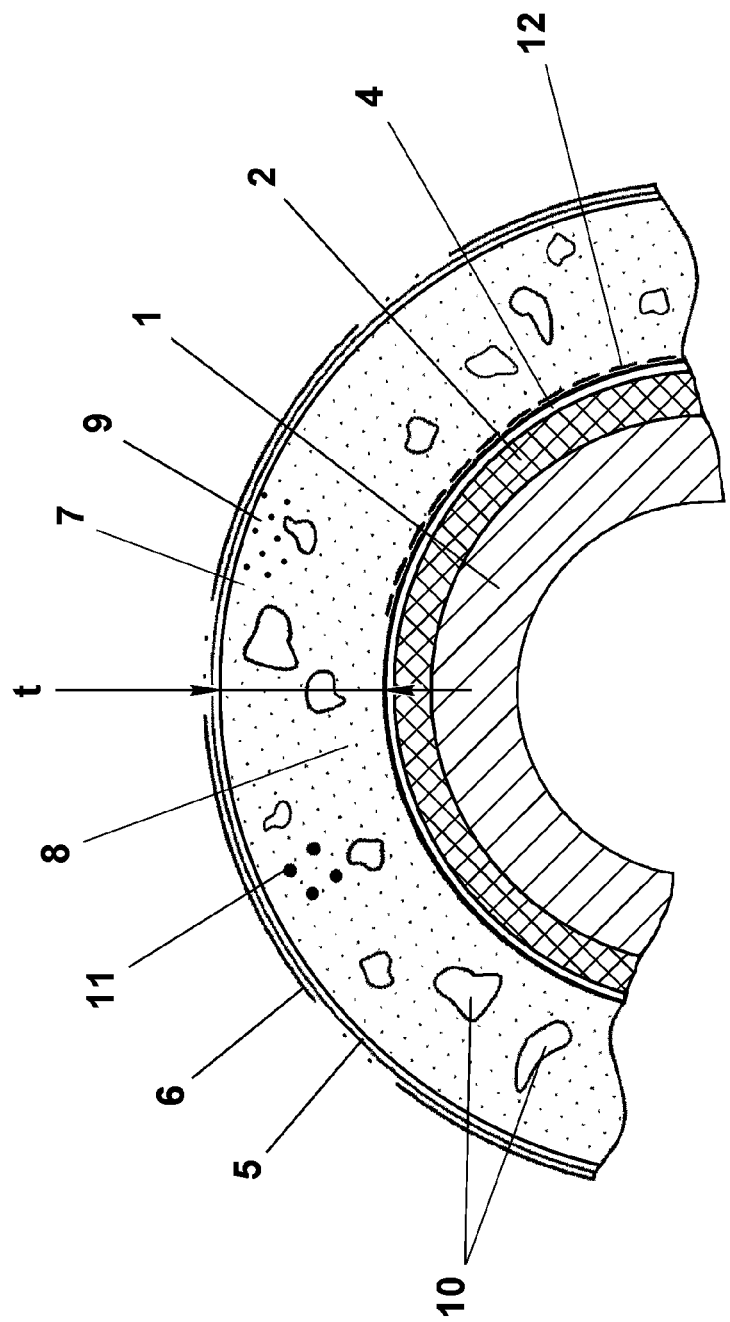
FIG. 3 shows a scaled up partial transversal section of the pipe and the fire-resistant layer, according to the present invention.

The busbar section (FIG. 1) contains an electrically conductive pipe 1 disposed within electrical insulation 2 placed between pipe contacts 3 disposed at the ends of the pipe. A grounding shield 4 is positioned around the electrical insulation 2 and it embraces the circumference of the electrical insulation 2. The above-mentioned elements are positioned within a metal case 5 having an outer fire-resistant coating 6. A fire-resistant layer 7 made of a cured composite material is located between the metal case 5 and the grounding shield 4. The composite material contains a binder 8 (FIG. 3) and a thermally expandable graphite filler 9 configured to form cavities 10 in the fire-resistant layer 7 when the busbar section and the fire-resistant layer 7 are exposed to excess heating. The case 5 is made of a non-magnetic material and is formed as a plain or corrugated vacuum-proof tube.

The thickness t of the fire-resistant layer 7 of the busbar section is in the range of 3 to 25 mm and is selected depending on configuration of the conductive pipe, its cross-section area, and the degree of protection thereof against outer temperature load. The thickness t limits, $t_{min}$=3 mm и $t_{max}$=25 mm, are defined by trial and the optimal thickness of the fire-resistant layer 7 is equal to 13.5 mm for the most common sizes of the busbar section. With the optimal thickness of the fire-resistant layer 7, the fire resistance of the busbar section and the throughput capability thereof remains for a predetermined time which is more than 180 minutes, when the busbar section is exposed to direct flame at the temperature of 1000° C.

In one embodiment of the busbar section disclosed herein (FIG. 3), the composite material includes epoxy resin combined with curing agent as the binder, and a thermally expandable graphite as the filler which particles 11 are placed within the composition material containing 5 to 60 wt % of the thermally expandable graphite and the epoxy resin together with the curing agent up to the balance. Thermally expandable graphite is provided in the form of a loose (not bound) powder which particles have dimensions of 0.5 to 0.8 mm.

Alternatively, the graphite particles are affixed to a special substrate 12 beforehand and then they are impregnated with an epoxy resin during the process of manufacturing the fire-resistant layer 7. In other examples of the busbar section, different known materials having the above-indicated properties may be used as the filler and the binder.

In another embodiment of the busbar section disclosed herein (FIG. 2), the pipe 1 is tubular and it has a chamber 13 communicated with through holes 14 provided in collars 15 at the ends of the pipe. Each hole 14 is placed between the contact 3 and the butt end of the pipe 1 and is communicated with diverged channels 16 provided in the collars 15 of the pipe. The channels 16 are configured in such a way that each contact 3 is positioned between outlet openings of a couple of the channels 16. The chamber 13, the through holes 14 and the channels 16 are configured for passing a cooling medium that may be used for assuring heat drain from the pipe 1 which is getting hot during its operation.

The busbar section (FIG. 1) operates as follows. The contacts 3 of two pipes 1 are coupled by joint sleeves (not shown) and electric current flows through the conductive pipe 1. The current heats the pipe 1 from inside up to 120° C. At this temperature the graphite parts 11 of the layer 7 and the outer fire-resistant coating 6 do not swell and do not impede the heat drain so the busbar section works under normal operation conditions. When the conductive pipe is heated from outside, the fire-resistant coating 6 and the case 5 protect the pipe 1 against the temperature load in predetermined limits, while the case 5 gets hot and transfers the heat through the fire-resistant layer 7 and the grounding shield 4 to the electric insulation 2. Upon further heating the busbar section up to 200° C., including exposure the busbar section to direct flame, the graphite parts 11 expand (swell up) and cavities 10 are formed in the layer 7, so the heat transfer from the case 5 to the electric insulation 2 and the pipe 1 is impeded. It was proved by trial that when the busbar section was exposed to direct flame and heated up to 1000° C., the pipe 1 and the entire busbar section remained functional for 180 minutes. In comparison with the known devices manufactured according to the closest related art, the heat impact durability of the claimed busbar section turned out to be 900% higher.

Figure 1:
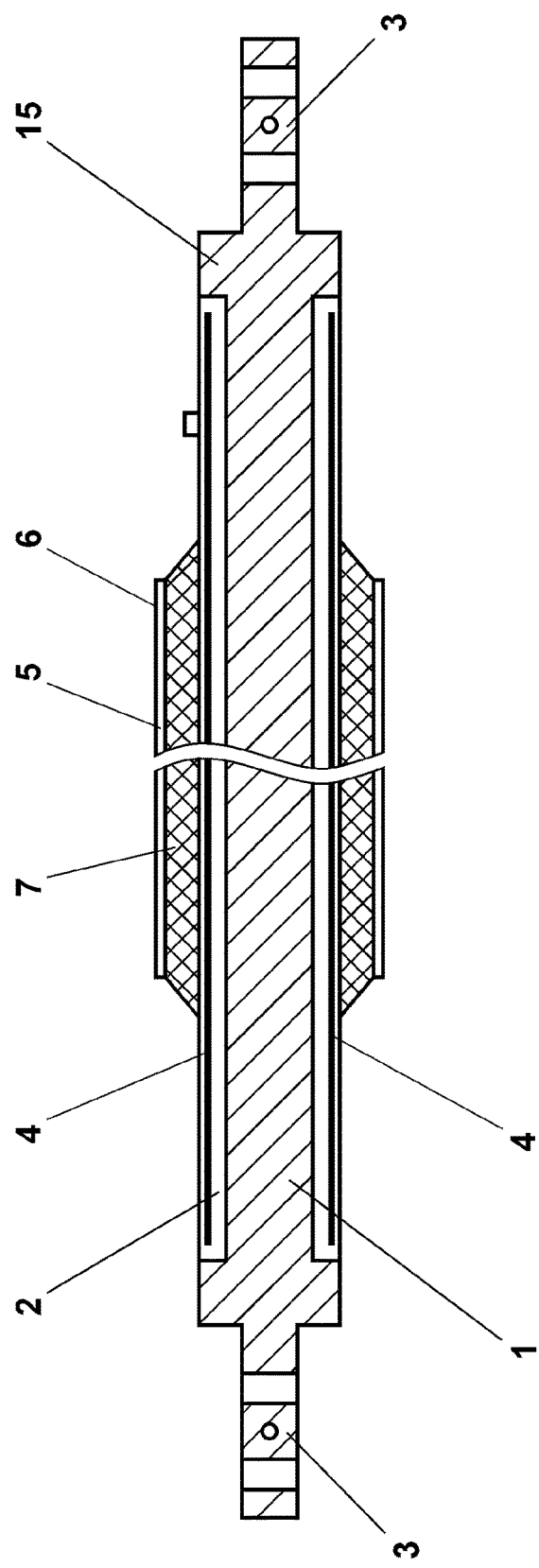
FIG. 1 shows a longitudinal sectional view of the first embodiment of the busbar section, according to the present invention.
Figure 2:
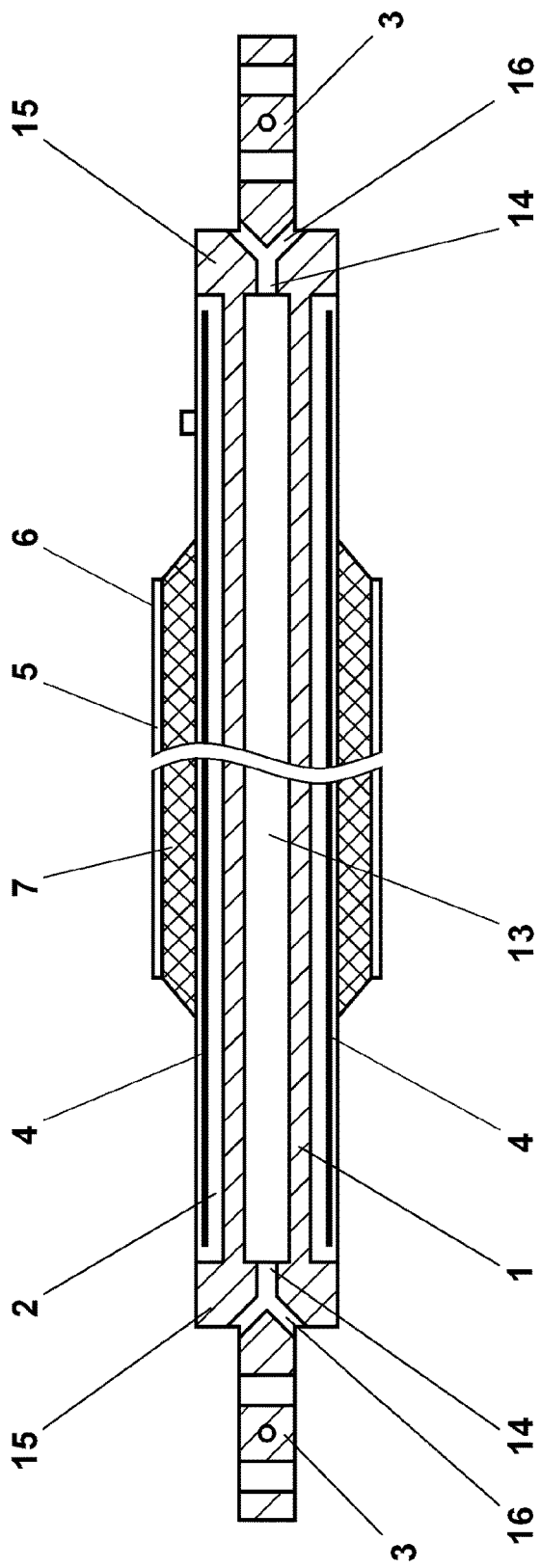
FIG. 2 shows a longitudinal sectional view of the second embodiment of the busbar section, according to the present invention.

When the busbar section shown in FIG. 2 is used, the time of normal operation of the pipe 1 is substantially increased comparatively to the same of the busbar section shown in FIG. 1, as a cooling medium (air or liquid) is passed through the chamber 13, the holes 14 and the channels 16, thereby the heat is drained from the conductive pipe so the heat impact durability of the busbar section according to FIG. 2 is increased comparatively to the same of the busbar section shown in FIG. 1.

The parameters of steady operation of the entire busbar section have been attained with the indicated optimal thickness of the fire-resistant layer 7. If the thickness of the fire-resistant layer 7 is maximal, material usage is substantially increased; if the layer thickness is below the minimal value, the fire resistance of the busbar section is sharply decreased. Using a special fireproof film substrate 12 in the fire-resistant layer 7 enables reducing the manufacturing labor content of the busbar section.

Herein, the fire resistance of the joint sleeve means the busbar section resistance to the temperature load and ability to maintain its operability for a predetermined time between the start of external excessive heating and the interruption of normal operation of the busbar section, after which the external heating is over. Practically, this time is defined by the safety requirements of the power consuming facilities like elevators to be operational in fire and other facilities closely related to human safety. The inventive busbar section possesses improved fire resistance in comparison with the busbar sections manufactured according to the above-indicated closest related art and available on the market.

We claim:

1. A high temperature insulated bus pipe comprising:
   a conductive pipe equipped with end contacts and disposed within electrical insulation;
   a grounding shield covering the insulation;
   a non-magnetic metal case having an outer fire-resistant coating, said case is formed as a vacuum-proof tube; and
   a fire-resistant layer made of a composite material located between the case and the grounding shield; said composite material is composed of thermally expandable graphite particles having dimensions of from 0.5 to 0.8 mm; said fire-resistant layer has a thickness in the range of 3 to 25 mm;
   wherein the composite material includes:
   a filler including thermally expandable graphite from 5 to 60 wt %; and
   a binder composed of epoxy resin combined with a curing agent up to the balance;
   said filler is configured to form cavities in the fire-resistant layer, when said high temperature insulated bus pipe is exposed to heating.

2. The high temperature insulated bus pipe of claim 1, wherein said graphite particles are distributed over epoxy resin of the binder in the form of loose powder.

3. The high temperature insulated bus pipe of claim 1, wherein said thermally expandable graphite particles are affixed to a substrate.

4. The high temperature insulated bus pipe of claim 3, wherein said case is formed plain or corrugated.

* * * * *